April 21, 1964 B. L. WELLER 3,130,356

TERMINAL LEAD CONNECTONS FOR COMPOSITE ELECTRICAL COMPONENTS

Original Filed June 5, 1958 3 Sheets-Sheet 1

INVENTOR.
Barton L. Weller
BY
Johnson and Kline
ATTORNEYS

April 21, 1964 B. L. WELLER 3,130,356

TERMINAL LEAD CONNECTONS FOR COMPOSITE ELECTRICAL COMPONENTS

Original Filed June 5, 1958 3 Sheets-Sheet 2

INVENTOR.
Barton L. Weller
BY
Johnson and Kline
ATTORNEYS

TERMINAL LEAD CONNECTONS FOR COMPOSITE ELECTRICAL COMPONENTS

Original Filed June 5, 1958 3 Sheets-Sheet 3

INVENTOR.
Barton L. Weller
BY
Johnson and Kline
ATTORNEYS

United States Patent Office 3,130,356

Patented Apr. 21, 1964

3,130,356

TERMINAL LEAD CONNECTORS FOR COMPOSITE ELECTRICAL COMPONENTS

Barton L. Weller, Easton, Conn., assignor, by mesne assignments, to Vitramon, Incorporated, Monroe, Conn., a corporation of Delaware Original application June 5, 1958, Ser. No. 740,147, now Patent No. 3,021,589, dated Feb. 20, 1962. Divided and this application May 3, 1960, Ser. No. 26,573

17 Claims. (Cl. 317—261)

This invention relates to composite electrical components of the type including capacitors, inductors, resistors, transistors and thermistors. More specifically, it pertains to improvements in such components and in the terminal leads thereof.

This application is a division of my copending application Serial Number 740,147, filed June 5, 1958, now Patent No. 3,021,589.

In general, electrical units or components of the above character are composite bodies comprising layers of materials having specific electrical properties which impart particular properties to the component. One of the problems in such components is to provide efficient electrical leads for connecting the said materials within the component to an external circuit. In the prior art the usual method of doing this has been to extend the said materials to an exposed surface of the component, and then to attach a lead to the exposed surface, over and in electrical contact with the said material, using a solder or brazing technique. This type of terminal has certain disadvantages. It is slow and tedious to produce. It is mechanically weak. It leads to difficulties due to the tendency of the silver to migrate over the surface of the component, eventually causing short circuits. Furthermore, it is awkward to install such leads.

One of the objects of my invention is to provide a radically new type of lead for electrical components of the types mentioned. Another object is to provide novel components having improved performance characteristics made possible by the novel type of terminal. Another object is to provide electrical components in which the electrically-active materials are completely embedded in the bodies of the components. Another object is to provide a novel form of electrical component of any of the types mentioned, in which the terminal leads may be extended optionally from either of two adjacent surfaces of the component, thereby permitting any such component to have leads extending axially (i.e., parallel to the layers of the component), or radially (i.e., perpendicularly to the layers of the component). Another object is to provide a flat electrical component of any of the types mentioned in which two or more terminal leads of this character are provided along a single edge of the component, whereby the component may be mounted optionally either endwise and perpendicular to, or flatwise and parallel to, a mounting board, thereby providing a component which will facilitate its being mounted on edge on a printed circuit board, and still permit it to be given any other desired orientation.

Another object is to provide means for preventing or inhibiting the migration of metal over the surface of an electrical component; e.g. for preventing or inhibiting silver from so migrating.

Other objects and advantages will be apparent from the specification and claims when considered in connection with the attached sheets of drawings, illustrating one form of the invention, wherein like characters represent like parts and in which:

Figures 1, 2:
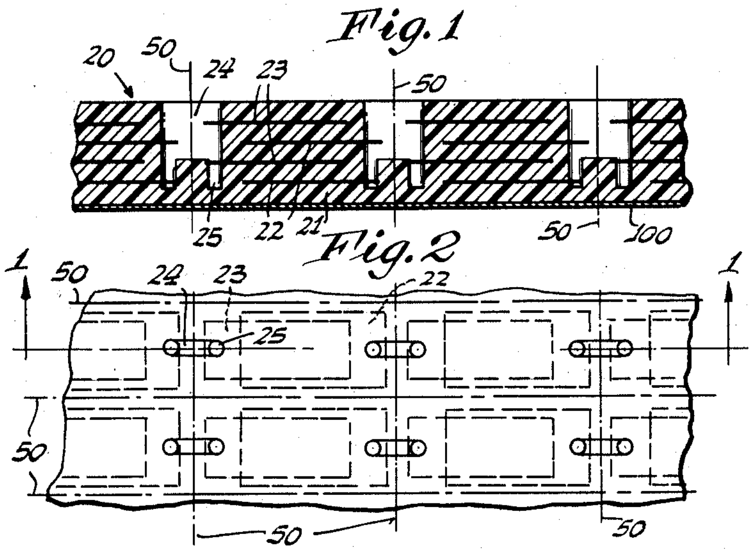
FIGURE 1 is a section taken on line 1—1 of FIGURE 2, showing a fragmentary longitudinal cross section of a laminate at one stage in the manufacture of capacitors.
FIGURE 2 is a fragmentary plan view of the same.
Figure 4:
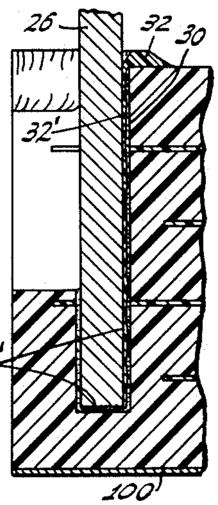
Figure 3A:
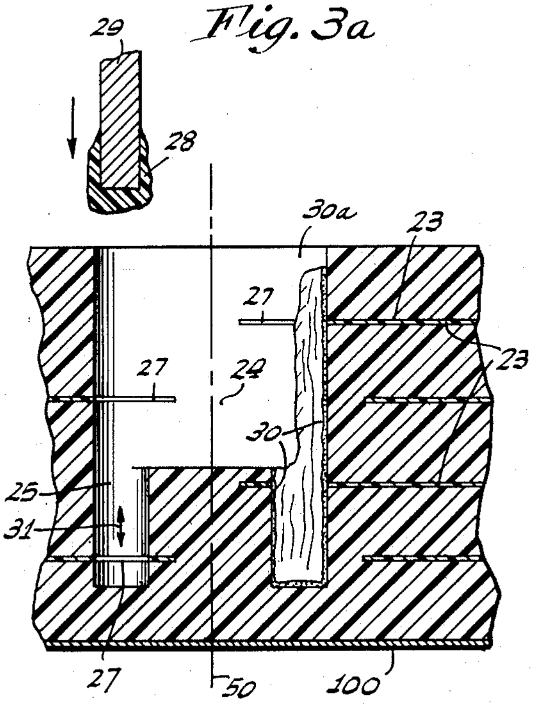
Figure 3B:
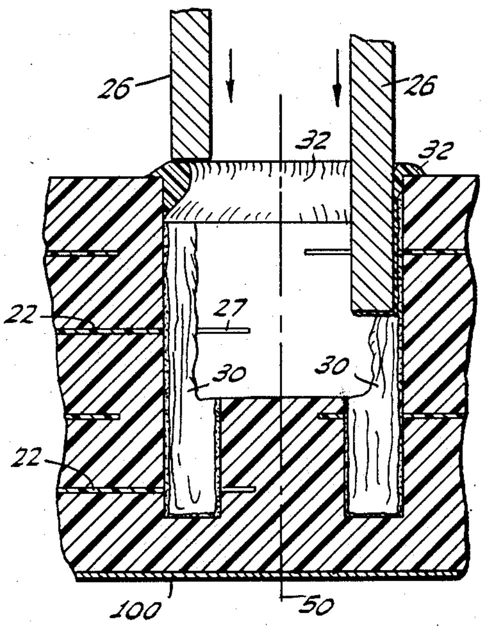
Figures 5, 6, 8, 9:
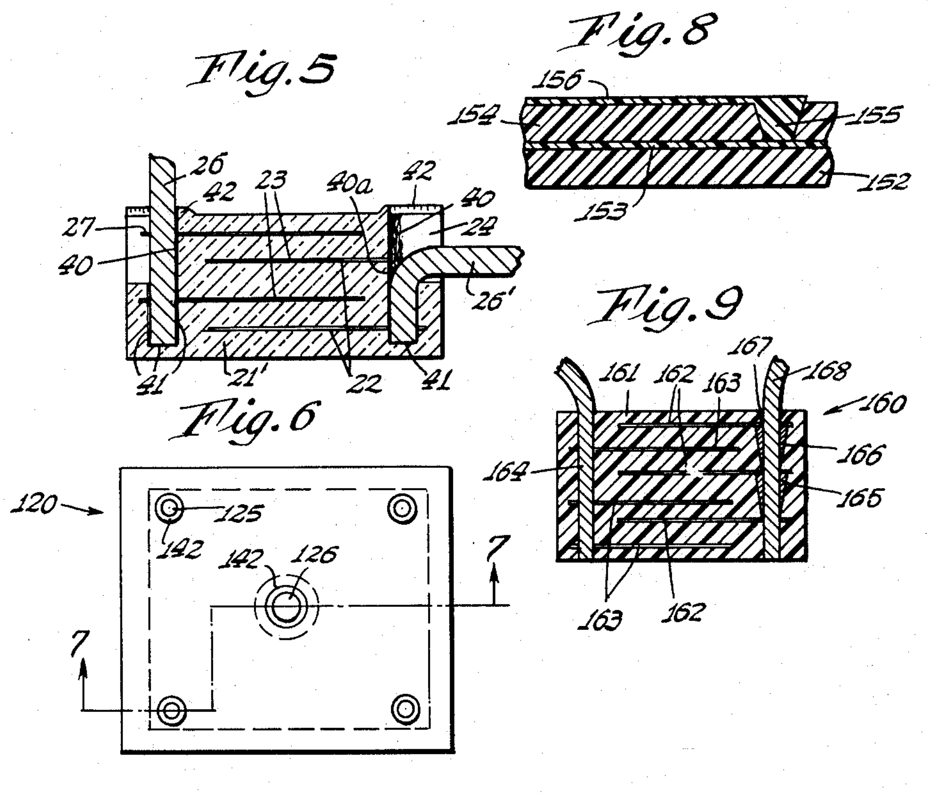
Figure 7:
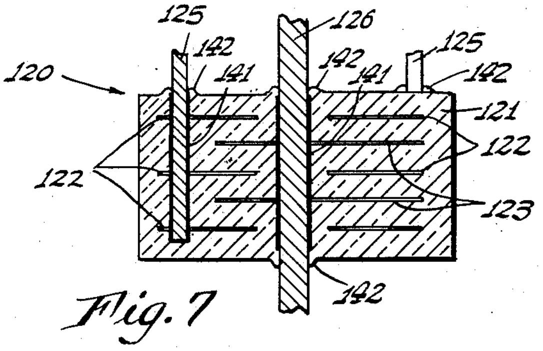
Figures 10, 11, 12, 13, 14, 15, 16, 17, 18:
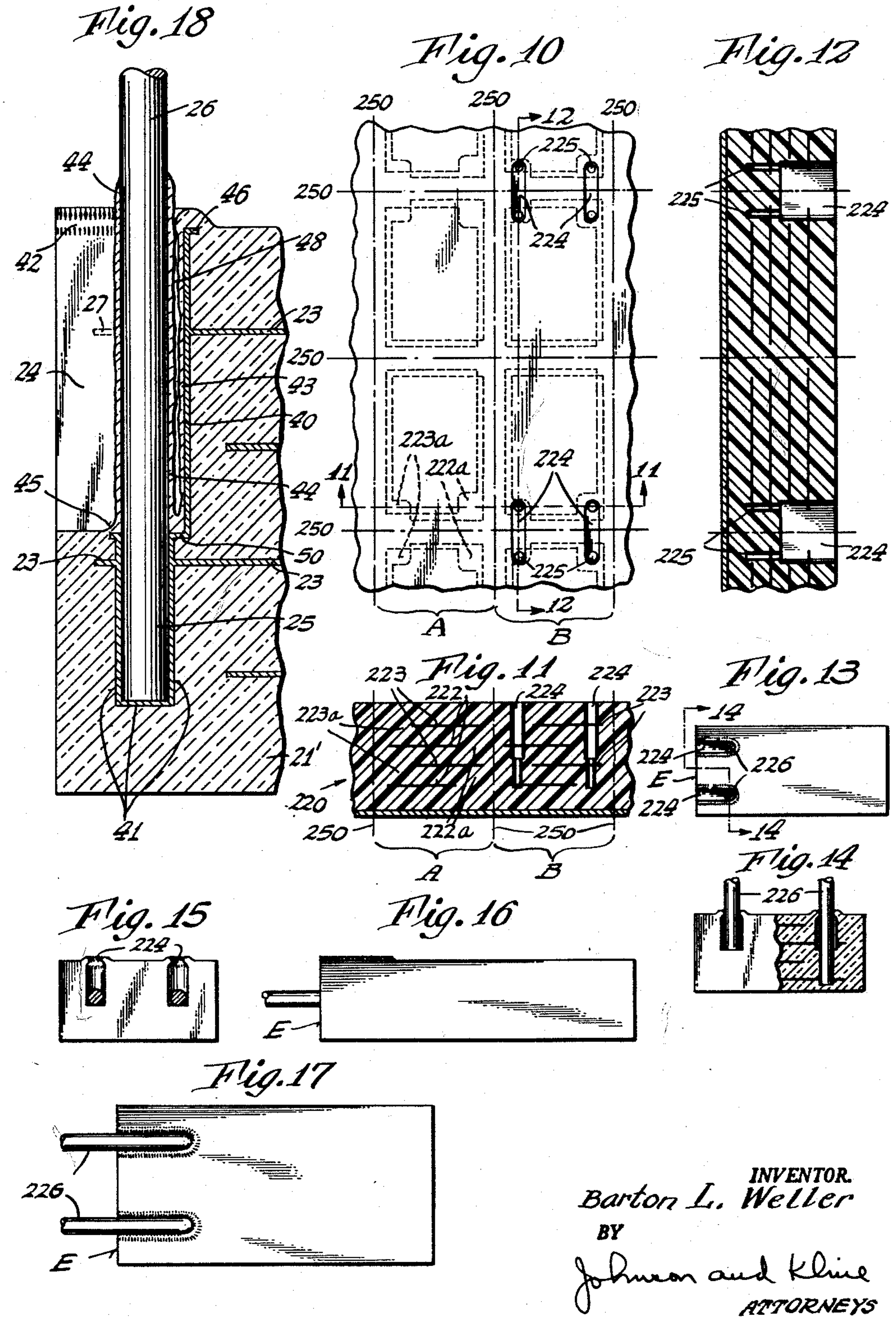

FIGURES 3*a* and 3*b* are fragmentary cross sections also taken along line 1—1 of FIGURE 2, but at larger scale, illustrating the unit during additional steps in its manufacture;

FIGURE 4 is a fragmentary section similar to a portion of FIGURE 3*b*, showing a portion of one end of a capacitor after the steps illustrated in FIGURES 3*a* and 3*b* have been completed, and the laminate of FIGURE 2 has been cut along the lines 50 to separate it into units, ready for curing or firing;

FIGURE 5 is a longitudinal cross section of a novel form of capacitor according to my invention after the capacitor has been cured or fired, fragmentary portions of the lead wires being shown, and one of the lead wires being bent to illustrate how the leads of this novel form of electrical unit may be extended at will either from the top or from the adjacent side of the unit;

FIGURE 6 is a plan view of another novel electrical unit made in accordance with my invention;

FIGURE 7 is a section along line 7—7 of FIGURE 6, fragmentary portions of the lead wires being shown;

FIGURE 8 is a fragmentary cross section of a laminate illustrating an alternative product according to my invention;

FIGURE 9 is a cross section of another electrical unit in an intermediate stage of manufacture, illustrating two additional novel terminal structures made in accordance with my invention;

FIGURE 10 shows a fragmentary plan view of a laminate similar to FIGURE 2 in which flat capacitors are being manufactured with two terminals along a single edge;

FIGURE 11 is a section on line 11—11 of FIGURE 10;

FIGURE 12 is a section on line 12—12 of FIGURE 10;

FIGURE 13 is a plan view of a finished capacitor from FIGURES 10–12 with its terminals extending radially or perpendicularly to the laminate;

FIGURE 14 is a section taken on line 14—14 of FIGURE 13;

FIGURES 15–17 are views of the capacitor of FIGURES 13 and 14 with its terminal leads extended axially or parallel to the laminate; and FIGURE 18 is an enlarged fragmentary view of the left-hand portion of FIGURE 5, incorporating a slight modification.

Referring now to the drawings, there is shown in FIGURES 1 and 2 a portion of a laminate, designated 20, in an intermediate stage of the manufacture of novel capacitors such as the one illustrated in FIGURE 5.

Laminate 20 is built upon an underlying permanent or temporary support 100. In the illustrated embodiment the support is flat, but a non-flat support may be used. The apertures 24 with well portions 25 are formed after the laminate has been built up. The laminate is built up on the support 100 in layers of electrically non-conducting material and of electrically conductive material. This may be done in the novel manner described in the patent to Pyungtoo W. Lee et al., No. 2,779,975, issued February 5, 1957, or by other methods.

The preferred method of building the laminate is described in detail in the above-identified application, and comprises the following steps:

(*a*) A fluid and plastic suspension of powdered dielectric material in a vehicle is prepared. Preferably, the dielectric is a fritted vitreous enamel. The inorganic parts of one such material are:

| | Percent by weight |
|---|---|
| PbO | 53.2 |
| $SiO_2$ | 27.1 |
| $K_2O$ | 2.6 |
| $Na_2O$ | 1.6 |
| $LiO_2$ | 0.7 |
| NaF | 4.5 |
| MgO | 3.6 |
| SrO | 6.7 |

These constituents are handled in a manner common to the art; namely, mixed and then melted at temperatures from 1000° C. to 1200° C. to convert the mixture to a fluid. This fluid is then poured into water to cool it rapidly and form a coarse frit. This frit is then ground to a powder. Such grinding is conveniently done in a ball mill where some of the constituents or the organic vehicles are added to carry the frit.

After the frit is ground to a particle size which will give a homogeneous body in the finished piece, the remaining part of the vehicles can be added to the mill and the grinding continued to mix all the components thoroughly. The vehicles commonly used contain these typical parts:

| | Percent by weight |
|---|---|
| Turpentine | 83½ |
| Hydrogenated rosin | 12 |
| Ethyl cellulose | ½ |
| Methyl ester of abietic acid | 2 |
| Diethyl oxalate | 2 |

In preparing the foregoing fluid suspension, it is preferred to employ from 20% to 30% by weight of vehicle in the suspensions and 80% to 70% by weight of inorganic material therein. Such a suspension is of fluid and plastic condition whereby layers thereof may be spread on a suitable base and on lower layers using suitable apparatus as described in the referenced patent.

(*b*) A fluid and plastic suspension of powdered or flaked silver in a vehicle is prepared. Silver in flake form has better conductivity after coalescing, and is preferred. For silk screen printing, which is a convenient method of applying layers of this material in this method, the powder is mixed with a medium in either a paint or colloid mill. A common medium is:

| | Percent by weight |
|---|---|
| Cellosolve | 85 |
| Ethyl cellulose | 5 |
| Hydrogenated rosin | 10 |

It is preferred to employ from 30% to 50% by weight vehicle and from 70% to 50% by weight silver for use in silk screen printing, however, these proportions may be varied according to the requirements of the particular depositing method employed.

(*c*) The above mixtures are formed into layers one over the other on either a temporary or a permanent base, hardening each layer before application of the succeeding layers while retaining part of the suspending medium which comprises the continuous phase of the suspension to prevent the layer from becoming discontinuous during the build-up process. The hardened layers thus formed comprise immobile layers of particles (either of the dielectric or of the silver, as the case may be) the layers having interstices all of which are filled by liquid vehicle and free of occluded gases. The structure has the consistency of partially set putty.

In forming the layers, the dielectric layers are continuous, but the layers of silver are formed in definite patterns in the manner described below. Each "layer" may, in fact, be built up of several successive layers of the same material. In FIGURE 1 the silver layers are indicated at 22 and 23. The nonconducting or dielectric layers lie between these silver layers and above and below the top and bottom silver layers, respectively. Since the silver layers are formed in discontinuous patterns, the adjacent dielectric layers where not separated by the silver layers join each other, thus in practice forming a continuous body 21 enclosing the silver layers 22 and 23.

The term layer, for the purposes of this invention, is defined as a sheet-like formation having a large area in comparison with its thickness.

Although the method of controlling the hardening of the layers so as to keep the interstices filled with vehicle, as described in (*c*) above is preferred, that method is not essential to the present invention. For example, each layer may be thoroughly dried before the succeeding layer is spread or otherwise applied.

Capacitors of the type illustrated in the embodiments of this application usually are made in smaller sizes than shown in the drawings, and the conductive layers are even thinner in proportion than illustrated. Typical capacitors used in electronic apparatus usually vary in thickness (vertical height in FIGURE 1) from .1″ to .5″, for example, with conductive layers such as 22 and 22 approximately .00001″ to .001″ thick, and non-conducting layers usually about .01″ to .1″ thick. It will thus be appreciated that some of the layers are actually too thin to appear in the drawings if they were made to scale.

In the present invention, although individual capacitors may be formed separately, it is preferred to form a large number of them in a single sheet, then cut the sheet up at a convenient time during the manufacturing process into individual capacitor units. FIGURE 2 shows a plan view of a fragmentary portion of such a sheet, including four complete capacitors which are to be separated by cutting along the broken lines 50. It will be noted that these lines do not cut through any of the conductive layers 22 and 23. Incidentally, conductive layers 22 and 23 usually are of the same width (vertically as viewed in FIGURE 2) but are shown of different widths to avoid confusion of lines. During the build-up of the sheet or laminate 20, the conductive layers are laid in patterns so that each section of the pattern will lie wholly within the area defined by two pairs of adjacent parallel boundary planes 50 which intersect each other to define one capacitor unit. By way of contrast, in the patent referred to above, the conductive layer patterns are so contrived that each conductive layer of each capacitor is severed when the sheet is cut up into individual units, the purpose being to provide an exposed edge of each conductive layer of each unit, to which a contact or lead may later be bonded.

The above preferred arrangement of conductive patterns in the illustrated embodiment of the present invention is not essential to the present invention, but it provides completely embedded conductive layers. However, completely embedded conductive layers could not be used were it not for my novel attachment of leads or terminals to the conductive elements of capacitors or those other electric units which comprise a plurality of layers of materials having specific electrical properties. The improvement is such that units may now be made with the conductive layers completely enclosed and leads embedded in the structure, yielding completely insulated, vapor-proof units which are more rugged, have longer life, and give better performance in averting noise and loss, and in yielding higher efficiency over a wide temperature range.

Thus, it will be seen that a very important feature of my invention is providing leads embedded in the body of a laminate and making electrical contact with one or more layers of electrically conductive material embedded in said laminate. It should be noted that, while the concepts of the invention are directed specifically to and shown in constructions wherein the electrically conductive layers lie wholly within the body of an electrical unit, they are applicable to units wherein some electrically conductive layers are exposed at the surface of the body and others lie wholly within the body.

Referring again to FIGURES 1 and 2, a preferred method of forming laminate 20 (before recesses 24 and 25 are formed therein) has been described above, as well as an alternative method. In the preferred method, at the conclusion of step (*c*), laminate 20 has been partially hardened to a consistency approximating that of partially set putty. Preferably at this stage recesses 24—25 are formed by suitable means, for example by drilling pairs of wells 25, one on each side of each plane indicated by the vertically disposed lines 50 in FIGURE 2, and then routing out the upper portion of the space between each pair of wells, as shown in FIGURE 1. Each well 25 is formed through one of the sets of laminae, either 22 or 23, as the case may be, and as clearly shown in FIGURE 1, each well extends downwardly in the laminate through all of its particular set of conductive laminae, but not all the way through the laminate 20. The portions of the laminae 22 and 23 which are cut are indicated at 27. Preferably, these portions 27 do not extend as far as indicated, but only far enough to make good electrical contact. Each well is large enough in diameter to accommodate a lead 26 to be inserted later, with enough clearance for a lining and a coating as described below, and each upper recess portion 24 is broad enough to permit free bending of an embedded terminal in the manner illustrated in the right-hand portion of FIGURE 5 after the units have been completed and fired.

The next step in the embedding of a terminal is illustrated in FIGURE 3*a*. A rod 29, the fragmentary lower portion of which is shown is dipped into fluid suspension of powdered, or preferably flaked silver, in a suitable vehicle. The fluid silver suspension described above in step (*b*) of the preferred method of building laminate 20 is suitable for this purpose, and has a pasty consistency. Rod 29 thus picks up a small quantity of silver suspension 28 and is inserted into the wall below it to coat or line said well. It is helpful to move rod 29 up and down slightly after it has been bottomed, as indicated by arrow 31. Care is taken to use no more silver paste than necessary to line the walls thinly over the areas indicated in the right-hand portion of FIGURE 3*a*, and an uncoated portion 30*a* preferably is left at the top. In this connection, the thickness of lining 30 is exaggerated in FIGURES 3*a*, 3*b*, and 4. Only a very thin lining is necessary to accomplish the desired purpose, and an excess may later result in silver migration between terminals, a phenomenon which is currently a problem in electrical circuits.

The next step in embedding a terminal is illustrated in FIGURE 3*b*, although this step is not essential, as will be explained below, and may be omitted. The purpose of this step is to prevent silver migration, in the finished product, of silver from lining 30. I have discovered that I can prevent such migration by supplying a quantity of ceramic suspension in recess 24—25 in contact with silver lining 30. For this purpose a fluid suspension of vitreous enamel the same as described above in step (*a*) of the preferred method of building laminate 20 is preferably used. A convenient way of applying this ceramic material is to place a quantity of it on the top rim of recess 24—25 as indicated at 32 in FIGURE 3*b*, then to bring the lower end of wire lead 26 in contact with fluid 32, as indicated in the left-hand portion of the figure, and then to move terminal 26 downwardly as illustrated in the right-hand portion of the figure, to carry with it a quantity of the material. Thus, when lead 26 is bottomed in the well, as illustrated in FIGURE 4, a coating of ceramic 32′ extends down from the top rim between terminal 26 and lining 30, and portions of this coating may extend without subsequent harm all the way down into the bottom of the well, as indicated at 32″.

After lead 26 has been bottomed from the position shown in the right-hand portion of FIGURE 3*b* to that shown in FIGURE 4, or rather after all of the leads 26 have been inserted in laminate 20 as aforenoted, the entire laminate is cut, using a thin blade like a razor blade, into individual units, by cutting along all of the lines 50 in both directions. For convenience in handling, it is preferable not to cut through the support 100, so as to leave all the units attached to a common support, but this is not essential. A fragmentary portion of one of the units is shown in FIGURE 4, ready for the next step.

All of the steps since formation of the laminate have been performed, preferably, while the laminate was in the state described at the conclusion of step (*c*) above in the formation of the laminate, that is with the interstices between the particles of the various layers filled with suspending medium.

The next step is to dry the units under controlled conditions as described in the application referred to above, so as to remove the volatiles and set the resins while at the same time preventing the formation of voids within the units. Depending upon the size of the units this drying may be done in an oven in which the temperature rises approximately ten degrees per hour. The drying can be carried to about 200° C. where all the volatiles are driven off and the entire structure is dry and rigid.

The units are now ready for firing, and they are fired at about 700° C. (a temperature below the melting point of silver and high enough to fuse the specific ceramic dielectric material used) on plates coated with an inert material such as calcined bentonite, in a manner common to the art. This burns off the support, vitrifies the enamel, coalesces the silver of the silver layers, causes the ceramic coating 32′—32″ to spread over the exposed areas of the silver lining 30, bonds the silver linings firmly to the walls of the wells 25, and welds the lower portion of each lead to lining 30. Lining 30 is also welded to the adjacent silver layers 22 or 23, as the case may be. A solidly bonded, monolithic structure results. The firing cycle takes 12 to 18 hours.

The resulting product is shown in FIGURE 5. The unit shrinks about 16 to 20% during the drying and firing, firmly gripping the two contacts at 41 in the embedded portions of each. In this same area 41 each lead is thoroughly welded to the silver lining. However, above the embedded portion, as at 40, leads 26 do not weld to the silver lining, except perhaps insignificantly along a single line of contact on the centerline upwardly from the region 40*a*, because, as stated above, each upper recess portion is made broad enough to permit free bending of an embedded terminal. Consequently, there is no gripping action upon the lead above the well 25 (FIG. 1). Lining 40 bonds firmly to the wall of the laminate. The right-hand lead in FIGURE 5 is shown bent down, showing the silver lining at 40 extending up the wall of recess 24 to rim 42 which rim, incidently, results from the ceramic 32 applied in the step illustrated in FIGURE 3*b*, and has become integral with the porcelain body 21′. The portion of lining 40 extending up on both sides of the point indicated at 40*a* provides a very excellent electrical connection between the upper silver electrode or layer 22 and lead 26′. Similarly, on the left side of FIGURE 5, the upper portion of lead 26 is not welded to silver lining 40, and lead 26 may be bent straight out to the left without impairing silver lining 40 which is tightly bonded to the wall of porcelain 21′ and welded to the upper silver layer 23, thus providing a very excellent electrical connection between lead 26 and layers 23, regardless of the bent position of lead 26.

FIGURE 18 is the same as the left-hand portion of FIGURE 5 except for the provision of a ledge 50, and shows more clearly the changes from FIGURE 4 caused by the drying and firing steps. When the unit of FIGURE 4 is fired, the silicate of the added ceramic material 32—32′—32″ becomes fluid. The unit shrinks and grips terminal 26 in the constricted lower recess or well portion 25. The added ceramic 32″ in well 25 either works its way through lining metal 30 to the body of the laminate or up along lead 26, or both. At any rate to all practical purposes it disappears. The added ceramic material indicated at 32 and 32′ in FIGURE 4 spreads over and coats all exposed surfaces of lining 30, the edges of conductive layers exposed in the upper recess 24, and a portion of lead 26. At the same time, conductive lining 30 forms a continuous layer bonded to the wall of recess 24, and welded to terminal 26 and to the edges of the conductive layers covered by it. The resulting structure is shown in FIGURE 18. Silver layer 40—41 is welded to conductive layers 23 and to terminal 26, the lower end of which is gripped in the well portion 25 of the recess. In well 25 the silver lining 41 becomes, in effect, a part of terminal 26, although to indicate it clearly in FIGURE 18 it is shown as a separate layer. A rim of ceramic 42 around the edge of recess 24 covers any spreading edges of lining 40, as at 46. A coating of ceramic 43 coats lining 40. It also covers any otherwise exposed edges of conductive layers 23, as at 27. The ceramic coating also covers any outcroppings of metal lining 41 from well 25, as indicated at 45, and incidentally spreads over the lower exposed portion of terminal 26, as indicated at 44, normally leaving a space 48 between layers 43 and 44. Thus, silver lining 40—41 provides an electrical connection between lead 26 and all layers 23 which were exposed in either upper recess 24 or in lower recess 25, and this lining is coated by a layer of ceramic which entraps it against "silver migration" and insulates it.

It is only necessary to put an extra supply of ceramic material such as 32 in FIGURE 3*b* on lining 30 at any point before the unit is fired, because when this ceramic melts it spreads over the entire exposed silver lining surface. The desirable amount of this extra ceramic is readily determined by experience, and an oversupply does not in any way impair the electrical contact through lining 40—41 between lead 26 and the silver layers (22 or 23) in the finished product. Very excellent bonding and conductivity result. In the foregoing description the fluid suspension 32 used to entrap the silver is ceramic because the non-conductive material layers of the embodiment are ceramic. It will be understood that when other materials are used for non-conductive layers, the same or another compatible material is used for suspension 32, and for the same purpose.

As explained above, in the embodiment of FIGS. 1–5 each upper recess portion is made broad enough to permit free bending of the lead embedded in the lower recess portion, so that while the terminal is gripped firmly in the lower portion it is not gripped in the upper portion, and conductive lining 40 remains substantially intact on the wall of the upper recess. FIGURE 18 illustrates a preferred embodiment in which, as indicated by ledge 50, additional space is provided between the lead 26 and the wall of upper recess 24 at the inner end of the recess, i.e. on the centerline section on which FIGS. 5 and 18 are taken. This ledge 50 extends around the lead to both lateral sides, as in the embodiment illustrated in FIG. 14. The extra space between the lead and the wall of the upper recess minimizes disturbance of conductive lining 40 by lead 26 and insures that it will have a protective coating 43 when the lead is bent outwardly, as in FIGS. 5 and 15–17.

As mentioned above, it is not essential that the extra ceramic material 32 be provided in the steps illustrated in FIGURES 3*a* and 4. When this extra material is not provided it has been found that a ceramic protective coating can still be provided over the exposed surfaces of lining 40 and over exposed edges of conductive layers 22 and 23 by curing or firing for a sufficient time (about 12 to 18 hours) to permit some of the ceramic or other insulating material 21 of the laminate to flow through and/or over the exposed metallic surfaces to coat the same very thinly.

FIGURES 6 and 7 show another embodiment of my invention made in accordance with the process described above, generally designated 120, and shown in the monolithic form it assumes after being fired. As in the preceding embodiment, a plurality of such units are formed from a laminate which is built up from suitable fluid suspensions to form alternate non-conductive and conductive layers. Suitable apertures are formed for the electrodes 125 and 126, and the surfaces of these apertures are coated with a metallic silver suspension. As in the first embodiment a small quantity of a fluid suspension of ceramic preferably is placed around each of the entrances to the apertures, and the electrodes are inserted. The central electrode or lead 126 extends clear through the unit. After the other steps of the process have been completed, the resulting structure comprises a porcelain body 121 in which are embedded and totally enclosed two sets of metallic layers 122 and 123. Layers 122 are bonded to each of the small electrodes 125 by the silver lining 141. Similarly, electrode 126 is bonded by lining 141 to silver layers 123. Each terminal or lead wire 125 and 126 is surrounded at its point of emergence from the body 121 by a rim of ceramic 142 which is integral with body 121.

FIGURE 8 shows another embodiment of my invention. Ceramic layer 152 is first formed on a temporary support (not shown) and silver layer 153 then formed thereon. Next, another layer of ceramic 154 is then spread over layer 153. An aperture is then formed through layer 154 at 155, for example by a suitable perforating point. Aperture 155 is then filled with the silver suspension, and another layer of silver suspension 156 is formed on layer 154 and over and in contact with the filling 155; or, the filling of aperture 155 may be accomplished during the formation of layer 156. This provides electrical connection between layers 153 and 156. This structure provides a convenient way of forming an electrical connection between two conductive layers such as 153 and 156. Layer 156 may be the external surface of a component, or it may be covered by another layer of insulating material to completely embed layers 153 and 156 within a component but electrically connected to each other. Of course, a plurality of conductive layers may be connected in this manner.

A further use of the structure just described for FIGURE 8 is illustrated in the right-hand portion of the capacitor 160 shown in FIGURE 9. Successive layers of non-conductive and conductive materials are built up, and selected conductive layers, such as layers 162, are connected by the means illustrated in FIGURE 8, originally being solidly filled between said layers at 165 and 166, with an additional top filling 167 to the top surface of the unit. An aperture is then formed downwardly through layers 162 and through fillings 165, 166, and 167, and lead 168 is then inserted. When the unit is later bonded or fired, very excellent electrical contact is permanently established between lead 168 and the layers 162.

In the left-hand portion of FIGURE 9 there is shown a simple lead 164 which is inserted vertically through the laminate and into electrical contact with layer 163. To install this terminal it is not necessary to form an aperture through the laminate before inserting the terminal, although this may be done if desired. The lead is inserted when body 161 is comparatively soft, so that it is only necessary to force the lead down into the body. Later, when the unit is fired or bonded, good electrical contact is established between layers 163 and lead 164.

FIGURES 13–17 illustrate the preferred form of capacitor according to my invention, and FIGURES 10–12 illustrate a manner of making it. In this form, both terminals are positioned adjacent a single edge E of the capacitor, and a recess 224 is formed in the upper portion of the capacitor from inwardly of the upstanding position of lead 226 to the said single edge, as shown. Thus the terminals may extend radially, that is perpendicularly to the laminate, as illustrated in FIGURES 13 and 14, or they may be bent to extend parallel to the laminate and out of edge E, as illustrated in FIGURES 15–17. With both terminals thus extended from edge E the unit is well adapted for edge mounting on a mounting board. This is of particular advantage for mounting on printed circuit boards. Yet the same unit may conveniently be oriented otherwise if desired, due to the novel form of inserted lead with recess opening both axially and radially.

FIGURES 10–12 illustrate the method of manufacturing capacitors of the form shown in FIGURES 13–17. The process steps are the same as described above in connection with FIGURES 1–4; the recesses simply being arranged to provide the two terminals and associated recesses adjacent a single edge of the capacitor. The upper recesses 224 are wider than the lower recesses 225 and they extend slightly beyond the respective recesses 225 at each end, as explained above in connection with FIGURE 18. To avoid confusion of lines the conductive layers 222 and 223 are shown as slightly offset in FIGURE 10, although preferably they are exactly superimposed as shown in FIGURES 11 and 12. The left-hand sides A in FIGURES 10 and 11 show the laminate 220 before formation of recesses 224, while the right-hand sides B of these figures illustrate the laminate with the recesses 224 formed therein. To provide for the inserted terminals contacting only their respective layers, a portion of each conductive layer is "inletted," as at 222*a* for layers 222 and at 223*a* for layers 223. In this way the recesses 224 are formed as shown in FIGURE 11 so as to provide for contact with the respective leads 226 when inserted and electrically bonded as described in connection with FIGURES 1–4. When the laminate 220 is cut up along lines 250, separate capacitors like those shown in FIGURES 13–17 are formed.

Although the method of making the electrical units in accordance with this invention is to form apertures in the laminate to receive the leads, it is not essential to form the apertures, provided the laminate is soft enough to insert the lead wires directly into the laminate.

Although the method of installing leads described above is employed before the individual units are separated by cutting up the laminate along selected lines, the several steps may be performed after the units have been separated, and the same principles apply to installation of leads in individual units. Other changes may be made in the process steps described for making my novel electrical units. For example, the hardening and curing steps may be combined, the laminate being gradually heated at first to complete hardening, and the temperature then increased for the curing phase. As another example it is sometimes desirable to cut up the laminate, then harden it, then form the apertures, depending on the particular techniques used for cutting and for forming the apertures.

Other techniques than those described may be used in the several steps. For example, to coat the apertures with the conductive layer, a hypodermic needle may be used. If the bonding metals do not have a migratory problem so that the use of an entrapping or coating medium is not needed, the terminal itself may be dipped into a suspension of the lining material and simply inserted in the aperture, thereby combining the lining and lead-inserting steps.

If desired, the conductive lining and the entrapping steps may be combined by forming a mixture of the conductive lining suspension and the entrapment material suspension and coating the aperture with this mixture, or dipping the lead into this mixture and then inserting it into the aperture. Upon firing, the lining of conductive material consolidates into a continuous conductive lining

40—41 (FIGS. 5 and 18), and the lower melting point ceramic or other entrapment material separates from the mixture and forms a continuous coating 43 over conductive lining 40 to "entrap" and insulate it. The entrapment material in well 25 flows to the like material of the laminate, leaving a conductive lining 41 welded to lead 26 and to lining 40, providing a highly conductive connection between 23 and 26.

The illustrated embodiments of the invention, and the description of a method of installing the leads in electrical units given above, have referred specifically to capacitors. However, the invention relates to other types of electrical components, such as inductors, resistors, thermistors, transistors, photosensitive elements, and other components comprising laminated bodies which have embedded in them layers of material having specific electrical properties.

Although the illustrated embodiments of the invention and the methods for achieving them have shown and referred to bodies in which the electrically non-conductive layers comprise a ceramic material which later is fired and to conductive layers comprising silver, other non-conducting or semi-conducting materials, or other materials having special electrical or magnetic properties may be employed. For example, suspensions of gold, rhodium, palladium, platinum, or similar metals, may be used to form the conductive layers of the laminate. For the non-conductive layers other inorganic materials may be used, such as aluminum-magnesium silicate, or barium titanate. In addition, suspensions of organic materials may be employed in lieu of vitreous enamel or other inorganic materials; such as, for example, partially condensed phenol-formaldehyde resins, partially polymerized vinyl resins, mixtures of monomeric and polymeric acrylic and substituted acrylic resins, tetrafluorethylene suspensions, nylon suspensions, polystyrene suspensions. Other suspensions of synthetic resinous materials capable of coalescing upon removal of the suspending solvents or chemically hardening by polymerization of condensation reactions into continuous sheets may also be used to form the non-conductive layers. Instead of firing the unit to bond it into a monolithic structure, which is the final step in the manufacture of the illustrated embodiments of the invention, when using other materials to form the non-conductive layers an appropriate curing method is used for the particular substance employed. Usually baking at a temperature appropriate for the material comprises the final curing step. In each case the conductive material chosen will cure under the same conditions as that for the non-conductive material.

It is not necessary that the conductive laminae, lead, and conductive lining of the lead-apertures be of the same materials so long as the contacting materials are compatible.

Although not essential to the present invention, I prefer to use leads of materials which are not subject to migration of the lead material over the ceramic body. This may be accomplished by selection of an appropriate lead material, or, in the case of silver leads, by allowing coating, or plating the surface of the lead with a material which inhibits silver migration.

While the various illustrated embodiments of the invention, specifically in relation to FIGS. 10–17, show the recess for the leads as being spaced along the side wall of the body, it will be understood that the enlarged upper portions thereof may be in communication and open together outwardly of the side wall. This may be accomplished by simultaneously routing out the upper portions of the recesses or by forming a notch in the body that passes through both the top surface and side wall thereof.

It will be seen that I have provided novel electrical components having improved performance characteristics made possible by my novel and improved terminal leads.

As various possible embodiments might be made of my invention and as various changes might be made in the embodiments set forth above, it is to be understood that all matter herein set forth or shown in the accompanying drawings is to be interpreted as illustrative and not in a limiting sense.

I claim:

1. An electrical unit comprising a laminated body of parallel layers having specific electrical properties, at least one of said layers being electrically conductive, each layer of said body being bonded to each adjacent layer throughout their coextensive surfaces and said electrically conductive layer lying wholly within said body, said body having a top surface parallel to said layers and having a recess extending from said top surface downwardly through said electrically conductive layer, said recess having a constricted lower portion and an enlarged upper portion, and a flexible lead of electrically conductive material extending into said recess and into said constricted lower portion thereof, said body being shrunk upon said lead for gripping and embedding the same in said constricted lower portion, said lead being of smaller diameter than the enlarged upper portion of said recess and having electrical contact with said electrically conductive layer and being bendable in said enlarged upper portion of said recess without destroying said electrical contact with said electrically conductive layer.

2. An electrical unit as in claim 1, wherein said body includes a side wall extending downwardly from said top surface and in which said enlarged upper portion of said recess opens outwardly of said side wall.

3. An electrical unit comprising a laminated body of parallel layers having specific electrical properties, at least one of said layers being electrically conductive, each layer of said body being bonded to each adjacent layer throughout their coextensive surfaces and said electrically conductive layer lying wholly within said body, said body having a top surface parallel to said layers and having a recess extending from said top surface downwardly through said electrically conductive layer, said recess having a constricted lower portion and an enlarged upper portion, a lining of electrically conductive material on the wall of said recess, said lining being in electrical contact with said electrically conductive layer, and a flexible lead of electrically conductive material extending into said recess and into said constricted lower portion thereof, said body being shrunk upon said lead for gripping and embedding the same in said constricted lower portion, said lead being of smaller diameter than the enlarged upper portion of said recess and being in electrical contact with said lining and being bendable in said enlarged upper portion of said recess without destroying the electrical contact of said lining with said electrically conductive layer or with said lead.

4. An electrical unit as in claim 3 having an electrically non-conductive coating on said electrically conductive lining in the enlarged upper portion of said recess for insulating and enclosing the same.

5. An electrical unit as in claim 3, wherein said body includes a side wall extending downwardly from said top surface and in which said enlarged upper portion of said recess opens outwardly of said side wall.

6. An electrical unit comprising a laminated body of parallel layers having specific electrical properties, at least one of said layers being electrically conductive, each layer of said body being bonded to each adjacent layer throughout their coextensive surfaces and said electrically conductive layer lying wholly within said body, said body having a top surface parallel to said layers and having a recess extending from said top surface downwardly through said electrically conductive layer, said recess having a constricted lower portion below said electrically conductive layer and an enlarged upper portion extending through said electrically conductive layer, a lining of electrically conductive material on the wall of said upper portion of said recess and extending downwardly at least to said constricted lower portion, said lining being in electrical contact with said electrically conductive layer, and a flexible lead of electrically conductive material extending into said recess and into said constricted lower portion thereof, said body being shrunk upon said lead for gripping and embedding the same in said constricted lower portion, said lead being of smaller diameter than the enlarged upper portion of said recess and being in electrical contact with said lining and being bendable in said enlarged upper portion of said recess without destroying the electrical contact of said lining with said electrically conductive layer or with said lead.

7. An electrical unit comprising a laminated body of parallel layers having specific electrical properties, at least two of said layers being electrically conductive and lying one above the other, said electrically conductive layers being separated by at least one layer having different electrical properties relative to said electrically conductive layers and having layers of said different electrical properties above and below said electrically conductive layers, each layer of said body being bonded to each adjacent layer throughout their coextensive surfaces and said electrically conductive layers lying wholly within said body, said body having a top surface parallel to said layers and having a recess extending from said top surface downwardly through said electrically conductive layers, said recess having a constricted lower portion extending through the lower electrically conductive layer and an enlarged upper portion extending through the upper electrically conductive layer, and a lining of electrically conductive material on the wall of said upper portion of said recess and extending downwardly at least to said constricted lower portion, said lining being in electrical contact with said upper electrically conductive layer, and a flexible lead of electrically conductive material extending into said recess and into said constricted lower portion thereof, said body being shrunk upon said lead for gripping and embedding the same in said constricted lower portion, said lead being of smaller diameter than the enlarged upper portion of said recess and having electrical contact with said lining and with said lower electrically conductive layer and being bendable in said enlarged upper portion of said recess without destroying the electrical contact of said lining with said upper electrically conductive layer or said lead with said lining and said lower electrically conductive layer.

8. An electrical unit as in claim 7, wherein said body includes a side wall extending downwardly from said top surface and in which said enlarged upper portion of said recess opens outwardly of said side wall.

9. An electrical unit comprising a laminated body of parallel layers having specific electrical properties, at least two of said layers being electrically conductive and lying substantially one above the other, said electrically conductive layers being separated by at least one layer having different electrical properties relative to said electrically conductive layers and having layers of said different electrical properties above and below said electrically conductive layers, each layer of said body being bonded to each adjacent layer throughout their coextensive surfaces and said electrically conductive layers lying wholly within said body, said body having a top surface parallel to said layers and a side wall extending downwardly from said top surface, said body being formed with a pair of recesses extending downwardly from said top surface, one of said recesses extending through one of said electrically conductive layers and the other recess extending through the other electrically conductive layer, said recesses each having a constricted lower portion and an enlarged upper portion, said enlarged upper portion extending downwardly from said top surface and outwardly to said side wall above said constricted lower portion, a flexible lead of electrically conductive material extending into each of said recesses and into said constricted lower portion thereof, said body being shrunk upon said leads for gripping and embedding the same in their said respective constricted lower portion, each lead being of smaller diameter than the enlarged upper portion of said recess and having electrical contact with its respective electrically conductive layer and being bendable in said enlarged upper portion of its respective recess without destroying the electrical contact with its respective electrically conductive layer.

10. An electrical unit comprising a laminated body of parallel layers having specific electrical properties, at least two of said layers being electrically conductive and lying substantially one above the other, said electrically conductive layers being separated by at least one layer having different electrical properties relative to said electrically conductive layers and having layers of said different electrical properties above and below said electrically conductive layers, each layer of said body being bonded to each adjacent layer throughout their coextensive surfaces and said electrically conductive layers lying wholly within said body, said body having a top surface parallel to said layers and a side wall extending downwardly from said top surface, said body being formed with a pair of spaced recesses extending downwardly from said top surface adjacent said side wall, one of said recesses extending through one of said electrically conductive layers and the other recess extending through the other electrically conductive layer, said recesses each having a diameter no greater than the diameter of the mouth thereof, a lead of electrically conductive material extending into each of said recesses and having electrical contact with its respective electrically conductive layer, said body being shrunk upon said leads for gripping and embedding the same in their respective recesses.

11. An electrical unit comprising a laminated body of parallel layers having specific electrical properties, at least two of said layers being electrically conductive and lying substantially one above the other, said electrically conductive layers being separated by at least one layer having different electrical properties relative to said electrically conductive layers and having layers of said different electrical properties above and below said electrically conductive layers, each layer of said body being bonded to each adjacent layer throughout their coextensive surfaces and said electrically conductive layers lying wholly within said body, said body having a top surface parallel to said layers and a side wall extending downwardly from said top surface, said body being formed with a pair of spaced recesses extending downwardly from said top wall, one of said recesses extending through one of said electrically conductive layers and the other recess extending through the other electrically conductive layer, said recesses each having a constricted lower portion and an enlarged upper portion extending downwardly from said top surface through its respective layer of electrically conductive material and outwardly to said side wall above said constricted lower portion, a lining of electrically conductive material on the wall of each of said recesses and bonded to the respective layer of electrically conductive material and extending downwardly at least to said constricted lower portion, and a flexible lead of electrically conductive material extending into each of said recesses and into the constricted lower portion thereof, said body being shrunk upon said leads for gripping and embedding the same in their said respective constricted lower portion, said leads each being of smaller diameter than the enlarged upper portion of its respective recess and being bonded to its respective electrically conductive lining and being bendable in the enlarged upper portion of its respective recess outwardly through said side wall without destroying the bond of said lining to said layer of electrically conductive material or to said lead.

12. An electrical unit as defined in claim 11, wherein the electrically conductive lining on the wall of the enlarged upper portion of each of said recesses is coated with electrically non-conductive material for insulating and enclosing the same.

13. A capacitor unit comprising a laminated body of substantially parallel layers having specific electrical properties, said layers including a plurality of dielectric layers and at least two groups of electrically conductive layers forming the opposite electrodes of the capacitor, said groups of electrically conductive layers each including at least one electrically conductive layer therein, each electrically conductive layer in said body being separated from adjacent electrically conductive layers by at least one dielectric layer, each layer of said body being bonded to each adjacent layer throughout their coextensive surfaces and at least one of said electrically conductive layers of each electrically conductive layer group lying wholly within said body, said body having a top surface parallel to said layers and a side wall extending downwardly from said top surface, said body being formed with a pair of recesses extending downwardly from said top surface, one of said recesses extending through one of said electrically conductive layer groups and the other recess extending through the other electrically conductive layer group, said recesses each having a constricted lower portion and an enlarged upper portion, said enlarged upper portion extending downwardly from said top surface and outwardly to said side wall above said constricted lower portion, a flexible lead of electrically conductive material extending into each of said recesses and into said constricted lower portion thereof, said body being shrunk upon said leads for gripping and embedding the same in their said respective constricted lower portion, each lead having electrical contact with all of the electrically conductive layers of its respective electrically conductive layer group, said leads being of smaller diameter than the enlarged upper portion of their respective recesses and being bendable in said enlarged upper portion of their respective recesses without destroying the electrical contact with the electrically conductive layers of their respective electrically conductive layer groups.

14. A capacitor unit comprising a laminated body of substantially parallel layers having specific electrical properties, said layers including a plurality of dielectric layers and at least two groups of electrically conductive layers forming the opposite electrodes of the capacitor, said groups of electrically conductive layers each including at least one electrically conductive layer therein, each electrically conductive layer in said body being separated from adjacent electrically conductive layers by at least one dielectric layer, each layer of said body being bonded to each adjacent layer throughout their coextensive surfaces and at least one of said electrically conductive layers of each electrically conductive layer group lying wholly within said body, said body having a top surface parallel to said layers and a side wall extending downwardly from said top surface, said body being formed with a pair of recesses extending downwardly from said top surface, one of said recesses extending through one of said electrically conductive layer groups and the other recess extending through the other electrically conductive layer group, said recesses each having a constricted lower portion and an enlarged upper portion, said enlarged upper portion extending downwardly from said top surface through at least one electrically conductive layer of its respective electrically conductive layer group and outwardly to said side wall above said constricted lower portion, a lining of electrically conductive material on the wall of each of said recesses and bonded to the electrically conductive layers through which its respective enlarged upper portion extends, said linings each extending downwardly at least to its respective constricted lower portion, a flexible lead of electrically conductive material extending into each of said recesses and into said constricted lower portion thereof, said body being shrunk upon said leads for gripping and embedding the same in their said respective consricted lower portion, each lead having electrical contact with its respective lining and with all of the electrically conductive layers of its respective electrically conductive layer group that are not bonded to said lining, said leads being of smaller diameter than the enlarged upper portion of their respective recesses and being bendable in said enlarged upper portion of their respective recesses without destroying the electrical contact with the electrically conductive lining and the electrically conductive layers of their respective electrically conductive layer groups.

15. An electrical unit comprising a unitary laminated body of parallel layers having specific electrical properties, at least one of said layers being electrically conductive, each layer of said body being bonded to each adjacent layer throughout their coextensive surfaces and said electrically conductive layer lying wholly within said body, said body having a top surface parallel to said layers and having a recess extending from said top surface downwardly through said electrically conductive layer, said recess having a diameter no greater than the diameter of the mouth thereof, and a lead of electrically conductive material extending into said recess and having electrical contact with said electrically conductive layer, said body being shrunk upon said lead for gripping and embedding the same in said recess.

16. An electrical unit as in claim 15 in which said recess has a lining of electrically conductive material on the wall thereof, said lining being in electrical contact with said electrically conductive layer, and in which said lead is in electrical contact with said lining.

17. An electrical unit comprising a unitary laminated body of parallel layers having specific electrical properties, at least two of said layers being electrically conductive and lying one above the other, said electrically conductive layers being separated by at least one layer having different electrical properties relative to said electrically conductive layers and having layers of said different electrical properties above and below said electrically conductive layers, each layer of said body being bonded to each adjacent layer throughout their coextensive surfaces and said electrically conductive layers lying wholly within said body, said body having a top surface parallel to said layers and having a recess extending from said top surface downwardly through said electrically conductive layers, said recess having a diameter no greater than the diameter of the mouth thereof, a lining of electrically conductive material on the wall of said recess, said electrically conductive lining being in electrical contact with said electrically conductive layers, and a lead of electrically conductive material extending into said recess and being in electrical contact with said electrically conductive lining, said body being shrunk upon said lead for gripping and embedding the same in said recess, said lead being bonded to said electrically conductive lining.

References Cited in the file of this patent

UNITED STATES PATENTS

| | | |
|---|---|---|
| 2,389,018 | Ballard | Nov. 13, 1945 |
| 2,713,700 | Fisher | July 26, 1955 |
| 2,796,504 | Pritikin et al. | June 18, 1957 |
| 2,823,361 | Hopkins | Feb. 11, 1958 |
| 2,919,483 | Gravley | Jan. 5, 1960 |

FOREIGN PATENTS

| | | |
|---|---|---|
| 439,064 | Great Britain | Nov. 28, 1935 |

UNITED STATES PATENT OFFICE

CERTIFICATE OF CORRECTION

Patent No. 3,130,356 April 21, 1964

Barton L. Weller

It is hereby certified that error appears in the above numbered patent requiring correction and that the said Letters Patent should read as corrected below.

Column 2, line 59, for "upon" read -- up on --; column 4, line 30, for "22 and 22" read -- 22 and 23 --; column 5, line 44, for "wall" read -- well --; column 10, line 59, for "allowing" read -- alloying --.

Signed and sealed this 18th day of August 1964.

(SEAL)
Attest:

ERNEST W. SWIDER
Attesting Officer

EDWARD J. BRENNER
Commissioner of Patents